United States Patent
Contino et al.

(10) Patent No.: US 10,162,693 B1
(45) Date of Patent: Dec. 25, 2018

(54) EVALUATION OF MOBILE DEVICE STATE AND PERFORMANCE METRICS FOR DIAGNOSIS AND TROUBLESHOOTING OF PERFORMANCE ISSUES

(71) Applicant: Sprint Communications Company L.P., Overland Park, KS (US)

(72) Inventors: Jeffrey Ronald Contino, Lenexa, KS (US); Jason R. Delker, Olathe, KS (US); Jason Salge, Olathe, KS (US); M. Jeffrey Stone, Overland Park, KS (US); Robert L. Waldrop, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 658 days.

(21) Appl. No.: 13/655,333

(22) Filed: Oct. 18, 2012

(51) Int. Cl.
*G06F 15/16* (2006.01)
*G06F 11/07* (2006.01)

(52) U.S. Cl.
CPC .................. *G06F 11/0748* (2013.01)

(58) Field of Classification Search
CPC ............. G06F 11/0748; G06F 11/079; G06F 11/2294; G06F 11/3438; G06F 11/3476; G06F 19/3412; G06F 9/4446; G06F 9/5072; G06F 11/0793; H04L 29/08; H04L 67/125; H04L 67/22; H04L 67/34; G06Q 30/02; G06Q 10/06; G06Q 30/0617; G06Q 30/0633; G06Q 30/0641; H04M 1/24; H04M 1/0254; H04M 1/72575; H04M 3/08; H04M 3/24; H04M 3/247; H04W 24/08
USPC ........................................................ 709/224
See application file for complete search history.

(56) References Cited

U.S. PATENT DOCUMENTS

| | | | |
|---|---|---|---|
| 6,055,433 A | 4/2000 | Yuan et al. | |
| 6,912,574 B2 | 6/2005 | Scifres et al. | |
| 7,293,201 B2 * | 11/2007 | Ansari | G06F 11/0715 714/25 |
| 7,693,876 B2 | 4/2010 | Hackworth et al. | |

(Continued)

FOREIGN PATENT DOCUMENTS

JP 2007042082 2/2007

OTHER PUBLICATIONS

Gailloux, Michael A., et al., Patent Application entitled, "Customer Initated Mobile Diagnostics Service" filed Dec. 2, 2009, U.S. Appl. No. 12/629,860.

(Continued)

*Primary Examiner* — Esther B. Henderson
*Assistant Examiner* — Ronak Patel

(57) ABSTRACT

A method of troubleshooting a mobile device receiving at a diagnostic server an initial snapshot of characteristics from a mobile device, wherein the initial snapshot includes metrics that will identify the mobile device, elements that will expose a performance issue related to the mobile device, and metrics that enable determination of a corrective action for remedying the performance issues, determining with a diagnostic processor the performance issue based on the initial snapshot, receiving at an evaluating server an after-care snapshot of the characteristics from the mobile device after a corrective action has been performed on the mobile device, and determining with an evaluating processor whether the corrective action remedied the performance issue based on the after-care snapshot.

15 Claims, 8 Drawing Sheets

(56) References Cited

U.S. PATENT DOCUMENTS

| | | | |
|---|---|---|---|
| 7,797,343 B2 | 9/2010 | Morain et al. | |
| 7,881,319 B2 | 2/2011 | Dobson et al. | |
| 8,200,206 B2* | 6/2012 | Parmar et al. | 455/420 |
| 8,320,904 B1 | 11/2012 | Celentano et al. | |
| 8,406,756 B1 | 3/2013 | Reeves et al. | |
| 8,422,988 B1 | 4/2013 | Keshav | |
| 8,532,610 B2* | 9/2013 | Manning Cassett | H04L 43/026 455/405 |
| 8,588,764 B1 | 11/2013 | Koller et al. | |
| 8,627,475 B2 | 1/2014 | Loveland et al. | |
| 8,644,813 B1 | 2/2014 | Gailloux et al. | |
| 8,763,131 B2 | 6/2014 | Archer et al. | |
| 8,782,472 B2* | 7/2014 | Ganesan et al. | 714/48 |
| 8,868,064 B1 | 10/2014 | Urbanek | |
| 8,909,990 B2* | 12/2014 | Davis et al. | 714/37 |
| 9,386,463 B1 | 7/2016 | Contino et al. | |
| 2002/0072359 A1 | 6/2002 | Moles et al. | |
| 2002/0087950 A1* | 7/2002 | Brodeur et al. | 717/124 |
| 2002/0165784 A1* | 11/2002 | Taggart et al. | 705/26 |
| 2003/0027580 A1 | 2/2003 | Goodjohn et al. | |
| 2003/0139905 A1 | 7/2003 | Helsper et al. | |
| 2004/0019807 A1 | 1/2004 | Freund | |
| 2004/0033799 A1 | 2/2004 | Fontius | |
| 2004/0203755 A1 | 10/2004 | Brunet et al. | |
| 2004/0218602 A1 | 11/2004 | Hrastar | |
| 2004/0225381 A1 | 11/2004 | Ritz et al. | |
| 2005/0055426 A1 | 3/2005 | Smith et al. | |
| 2005/0107107 A1 | 5/2005 | Shahidi et al. | |
| 2005/0114504 A1* | 5/2005 | Marolia et al. | 709/224 |
| 2005/0262563 A1 | 11/2005 | Mahone et al. | |
| 2006/0203738 A1 | 9/2006 | Fok et al. | |
| 2006/0223495 A1 | 10/2006 | Cassett et al. | |
| 2006/0233114 A1 | 10/2006 | Alam et al. | |
| 2006/0234698 A1 | 10/2006 | Fok et al. | |
| 2007/0180521 A1 | 8/2007 | Malkin et al. | |
| 2007/0206546 A1 | 9/2007 | Alberth, Jr. et al. | |
| 2007/0207800 A1 | 9/2007 | Daley et al. | |
| 2007/0287387 A1 | 12/2007 | Keum et al. | |
| 2008/0084993 A1* | 4/2008 | Peddireddy | H04M 1/24 379/433.01 |
| 2008/0214186 A1 | 9/2008 | Bizzari et al. | |
| 2008/0263398 A1 | 10/2008 | Mori et al. | |
| 2008/0274716 A1* | 11/2008 | Fok | H04W 12/08 455/410 |
| 2008/0288946 A1 | 11/2008 | Richards et al. | |
| 2008/0301295 A1 | 12/2008 | Malkin et al. | |
| 2009/0049544 A1 | 2/2009 | Kashi | |
| 2009/0106278 A1 | 4/2009 | Ramacher et al. | |
| 2009/0156199 A1* | 6/2009 | Steenstra | G06F 19/3412 455/425 |
| 2009/0163197 A1 | 6/2009 | Martin et al. | |
| 2009/0213871 A1 | 8/2009 | Carlson et al. | |
| 2009/0288144 A1 | 11/2009 | Huber et al. | |
| 2010/0003967 A1 | 1/2010 | Datta et al. | |
| 2010/0167658 A1 | 7/2010 | Hoffman | |
| 2010/0172257 A1 | 7/2010 | Yu | |
| 2010/0195503 A1 | 8/2010 | Raleigh | |
| 2010/0197238 A1 | 8/2010 | Pathuri et al. | |
| 2010/0235918 A1 | 9/2010 | Mizrahi et al. | |
| 2010/0281155 A1 | 11/2010 | Cipollone et al. | |
| 2010/0323742 A1 | 12/2010 | Allen et al. | |
| 2010/0330954 A1* | 12/2010 | Manning Cassett | H04L 43/026 455/405 |
| 2011/0010358 A1 | 1/2011 | Zane et al. | |
| 2011/0039571 A1 | 2/2011 | Bodine et al. | |
| 2011/0083069 A1* | 4/2011 | Paul | G06F 8/60 715/234 |
| 2011/0098018 A1 | 4/2011 | Engel | |
| 2011/0161484 A1 | 6/2011 | Van den Bogaert et al. | |
| 2011/0199934 A1 | 8/2011 | Olofsson et al. | |
| 2011/0213865 A1 | 9/2011 | Durazzo et al. | |
| 2011/0280130 A1 | 11/2011 | Foottit et al. | |
| 2011/0320607 A1 | 12/2011 | Harrang et al. | |
| 2012/0053778 A1 | 3/2012 | Colvin et al. | |
| 2012/0072991 A1 | 3/2012 | Belani et al. | |
| 2012/0084184 A1 | 4/2012 | Raleigh et al. | |
| 2012/0101952 A1 | 4/2012 | Raleigh et al. | |
| 2012/0102191 A1 | 4/2012 | Rabii | |
| 2012/0108225 A1 | 5/2012 | Luna et al. | |
| 2012/0115433 A1 | 5/2012 | Young et al. | |
| 2012/0117478 A1 | 5/2012 | Vadde et al. | |
| 2012/0129503 A1 | 5/2012 | Lindeman et al. | |
| 2012/0196543 A1 | 8/2012 | Andersson et al. | |
| 2012/0221955 A1 | 8/2012 | Raleigh et al. | |
| 2012/0240229 A1 | 9/2012 | Sobel et al. | |
| 2012/0252357 A1 | 10/2012 | Tarleton et al. | |
| 2012/0317645 A1 | 12/2012 | Fortier | |
| 2013/0007245 A1 | 1/2013 | Malik et al. | |
| 2013/0018965 A1 | 1/2013 | Ramachandran et al. | |
| 2013/0023230 A9 | 1/2013 | Momtahan et al. | |
| 2013/0031599 A1 | 1/2013 | Luna et al. | |
| 2013/0036450 A1 | 2/2013 | Kim et al. | |
| 2013/0042294 A1 | 2/2013 | Colvin et al. | |
| 2013/0047038 A1* | 2/2013 | Huang | 714/38.1 |
| 2013/0053023 A1 | 2/2013 | Meredith et al. | |
| 2013/0055401 A1 | 2/2013 | Kim et al. | |
| 2013/0103973 A1* | 4/2013 | Werth et al. | 714/2 |
| 2013/0262935 A1* | 10/2013 | Kutchuk | G06F 11/3438 714/39 |
| 2013/0276124 A1* | 10/2013 | Tahir | G06F 21/577 726/25 |
| 2013/0305101 A1* | 11/2013 | Gupta | G06F 21/56 714/47.3 |
| 2013/0311836 A1 | 11/2013 | Hurst et al. | |
| 2014/0106704 A1* | 4/2014 | Cooke | H04W 24/08 455/405 |
| 2014/0113588 A1 | 4/2014 | Chekina et al. | |
| 2014/0165203 A1 | 6/2014 | Friedrichs et al. | |
| 2014/0289864 A1* | 9/2014 | Dimitrakos | G06F 21/53 726/26 |

OTHER PUBLICATIONS

Contino, Jeff, et al., Patent Application entitled, "Application Risk Analysis", filed Nov. 19, 2012, U.S. Appl. No. 13/681,337.

Pre-Interview Communication dated Oct. 2, 2012, U.S. Appl. No. 12/629,860, filed Dec. 2, 2009.

FAIPP Office Action dated Dec. 7, 2012, U.S. Appl. No. 12/629,860, filed Dec. 2, 2009.

Final Office Action dated Apr. 9, 2013, U.S. Appl. No. 12/629,860, filed Dec. 2, 2009.

Koller, Gary D., et al., Patent Application entitled "Wireless Network Edge Guardian," filed Jan. 26, 2012, U.S. Appl. No. 13/359,311.

Sung, Dan, App of the Day—3G Watchdog (Android), http://www.pocket-lint.com/news/103874-data-monitoring-app-for-android, May 26, 2010.

Advisory Action dated Jun. 6, 2013, U.S. Appl. No. 12/629,860, filed Dec. 2, 2009.

FAIPP Pre-Interview Communication dated May 6, 2013, U.S. Appl. No. 13/359,311, filed Jan. 26, 2013.

Notice of Allowance dated Sep. 30, 2013, U.S. Appl. No. 12/629,860, filed Dec. 2, 2009.

FAIPP Pre-Interview Communication dated Nov. 17, 2014, U.S. Appl. No. 13/681,337, filed Oct. 18, 2012.

FAIPP Office Action dated Mar. 26, 2015, U.S. Appl. No. 13/681,337, filed Oct. 18, 2012.

FAIPP Pre-Interview Communication dated Jan. 22, 2013, U.S. Appl. No. 13/293,104, filed Nov. 9, 2011.

FAIPP Office Action dated Apr. 29, 2013, U.S. Appl. No. 13/293,104, filed Nov. 9, 2011.

Final Office Action dated Sep. 9, 2013, U.S. Appl. No. 13/293,104, filed Nov. 9, 2011.

Advisory Action dated Nov. 12, 2013, U.S. Appl. No. 13/293,104, filed Nov. 9, 2011.

Office Action dated Mar. 5, 2014, U.S. Appl. No. 13/293,104, filed Nov. 9, 2011.

(56) References Cited

OTHER PUBLICATIONS

Notice of Allowance dated Jun. 16, 2014, U.S. Appl. No. 13/293,104, filed Nov. 9, 2011.
Final Office Action dated Jul. 21, 2015, U.S. Appl. No. 13/681,337, filed Nov. 19.
Office Action dated Sep. 30, 2015, U.S. Appl. No. 13/681,337, filed Nov. 19.
Notice of Allowance dated Mar. 7, 2016, U.S. Appl. No. 13/681,337, filed Nov. 19.
Notice of Allowance dated Jul. 1, 2013, U.S. Appl. No. 13/359,311, filed Jan. 26, 2012.

* cited by examiner

US 10,162,693 B1

EVALUATION OF MOBILE DEVICE STATE AND PERFORMANCE METRICS FOR DIAGNOSIS AND TROUBLESHOOTING OF PERFORMANCE ISSUES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of mobile devices may occasionally experience problems with their mobile devices and/or the services provided thereto. The manufacturer of, and/or the service provider for, the mobile device may attempt to address the problems, based on information from the users. Users may not provide sufficient and/or accurate information to allow for efficient system diagnosis, when describing the problems.

SUMMARY

In an embodiment, a method of troubleshooting a mobile device is disclosed. The method comprises receiving at a diagnostic server an initial snapshot of characteristics from a mobile device, wherein the initial snapshot includes metrics that will identify the mobile device, elements that will expose a performance issue related to the mobile device, and metrics that enable determination of a corrective action for remedying the performance issues, determining with a diagnostic processor the performance issue based on the initial snapshot, receiving at an evaluating server an after-care snapshot of the characteristics from the mobile device after a corrective action has been performed on the mobile device, and determining with an evaluating processor whether the corrective action remedied the performance issue based on the after-care snapshot.

In an embodiment, a method of trouble shooting a mobile device is provided. The method comprises receiving at a diagnostic server an initial snapshot of mobile device characteristics, wherein the snapshot comprises mobile device state information and static diagnostic information, determining with a processor a performance issue with the mobile device based on an analysis of the mobile device state information and the static diagnostic information, determining with a processor a recommended corrective action for the mobile device based on comparison of the performance issue with past corrective actions taken on other mobile devices that experienced the performance issue contained in a solutions data store, receiving at the diagnostic server an after-care snapshot of the mobile device characteristics after implementing the recommended corrective action, and determining whether the recommended corrective action was successful.

In an embodiment, a method for determining an upsell proposal to a mobile device service provider subscriber is provided. The method comprises receiving at a server a snapshot of mobile device characteristics from the mobile device, determining with a processor a performance issue with the mobile device using the snapshot, identifying with a processor an upsell proposal based on the performance issue, wherein the upsell proposal is a proposal to sell the subscriber something new or additional, and providing the upsell proposal to the mobile device service provider subscriber.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
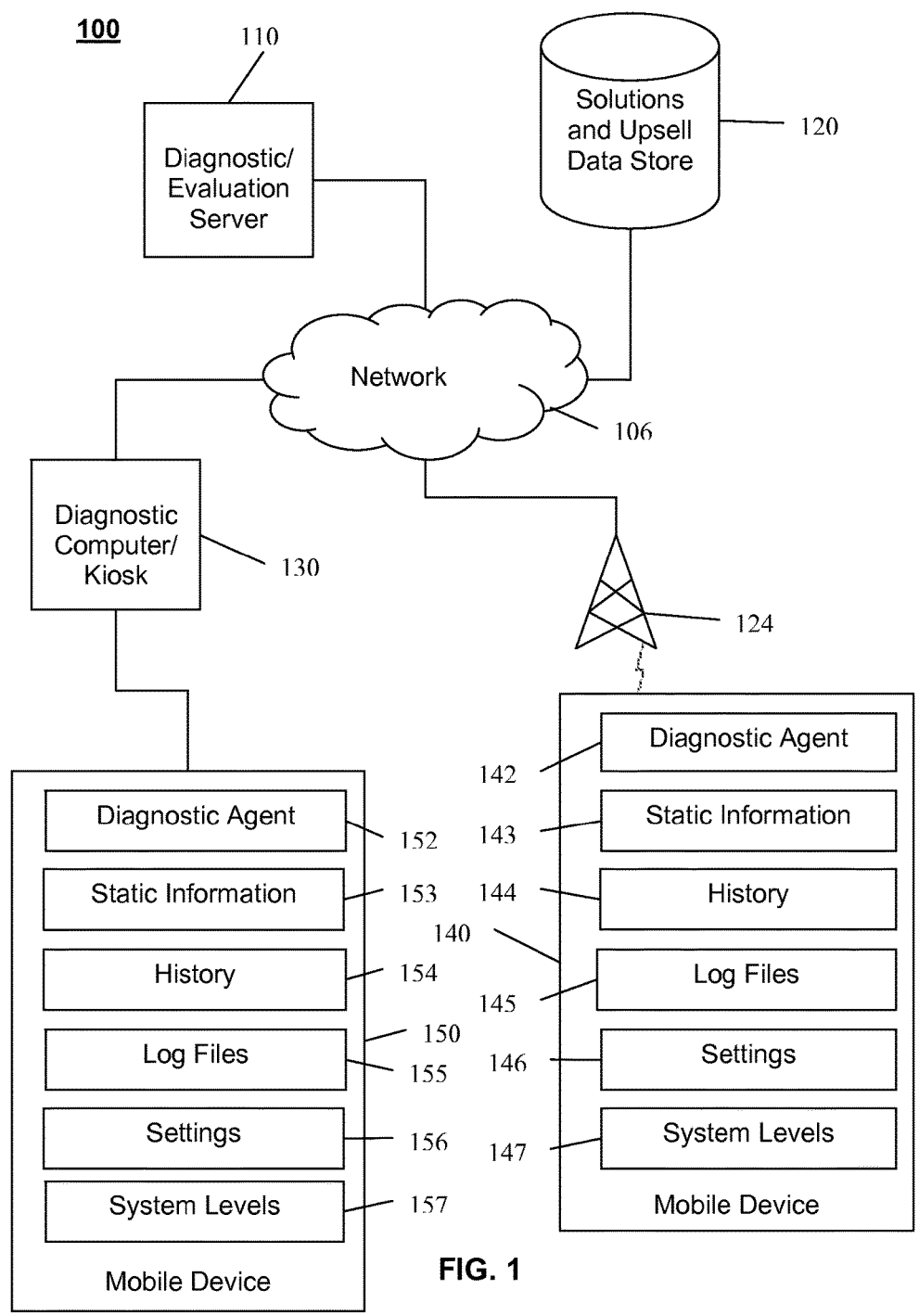
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides systems and methods promoting diagnosing and correcting performance issues on mobile devices. In an embodiment, a snapshot of characteristics of the mobile device is obtained by a service provider. The snapshot of characteristics may include, for example, one or more log files, user settings, carrier settings, initial manufacturer settings, hardware and software static information (e.g., serial numbers, model numbers, version numbers, fixed addresses), and runtime measures (e.g., CPU/memory (fixed, virtual, external)/thread/procedure utilization and idle times). The snapshot characteristics provide information that may be relevant in identifying a performance issue with the portable device and at identifying an appropriate solution. An after-care snapshot may be obtained by the service provider after performing a corrective action on the mobile device. Analysis of the after-care snapshot may enable the service provider to determine how successful the corrective action was in addressing the performance issue of the mobile device. In an embodiment, the system may determine a recommended next corrective action when the recommended corrective action fails to resolve the performance issue.

In an embodiment, the service provider may maintain a data store of identified performance issues and recommended solutions (or corrective actions) for each performance issue type. The recommended solutions may also be further associated with specific types of mobile devices. The service provider may update the data store when a performance issue is addressed with the corrective action taken. The service provider may analyze the data from snapshots from many mobile devices to determine which corrective actions are more likely to succeed for each type of performance issue identified. The analysis may allow the service provider to converge on a corrective action for a particular performance issue that is most likely to address the service provider based on the fact that it has been found most often successful in addressing past performance issues of the same type. The service provider may maintain a ranked list of corrective actions to try with the most likely ranked first followed by the next most likely and so on.

In an embodiment, the service provider may use the received initial snapshot characteristics as an opportunity to upsell a service, new mobile device, new application, or peripheral component to the customer. For example, analysis of the initial snapshot characteristics of the mobile device may reveal that the solution for a performance issue raised by the customer and/or identified through analysis of the initial snapshot characteristics of the mobile device may be addressed by upgrading an aspect of the customer's mobile device. The analysis of the initial snapshot characteristics may reveal that the customer's needs from their mobile device would be better served by upgrading to a different service plan or a different mobile device.

In an embodiment, a customer may bring their mobile device into a retail store because they are having problems with an application unexpectedly closing while they are using the mobile device. A customer service representative at the retail store may connect the customer's mobile device to a diagnostic computer/kiosk to determine a cause of the problem. The connection may be by means of a cable such as a USB cable or by means of a wireless connection such as WiFi or Bluetooth®. The diagnostic computer/kiosk may interact with a diagnostic agent on the customer's mobile device to retrieve various pieces of information from the customer's mobile device. The information may include items such as a use history, log files, configuration settings, system levels, etc. The information retrieved may be a snapshot of the mobile device. The diagnostic computer/kiosk may use the information from the customer's mobile device to determine a likely issue causing the customer's problem. In an embodiment, the diagnostic computer/kiosk may consult with a diagnostic server and/or a solutions data store that may have collected information from other user's mobile devices and may contain a likely solution to the customer's problems. For example, it may be determined that the application closes every time a certain action is performed elsewhere on the device, such as accepting a telephone call. A solution as determined from the collection of data from a number of other user's with a similar problem may be a software patch upgrade for the customer's mobile device. This may be presented to the customer service representative who may then inform the customer and may perform the necessary actions to upgrade the customer's mobile device. Alternatively, the customer service representative may perform the actions to upgrade the mobile device. In an embodiment, the kiosk takes a snapshot of the mobile device after the actions are taken to upgrade and/or remedy the problem experienced by the mobile device.

It may also be determined that in addition to a software upgrade that a new device with increased memory would also avoid the problem as well as perform better than the customer's existing mobile device would with the software upgrade. The customer service representative may present the customer with both options. Thus, in addition to solving the customer's problem, the service provider may use this opportunity to upsell to the customer, for example by selling the customer a higher performance and/or later model of mobile device In an embodiment, rather than the customer bringing the mobile device to the retail store for problem diagnosis and solution, the customer may access a diagnostic agent on the customer's mobile device to contact a diagnostic evaluation server wirelessly. The diagnostic evaluation server may diagnose the problem, locate a solution from a solutions data store, and push a software upgrade to the customer's mobile device without the involvement of a customer service representative. For example, in an embodiment, the agent on the mobile device may provide a snapshot of the mobile device to the diagnostic/evaluation server, and the diagnostic/evaluation server may evaluate and/or analyze the snapshot. In an embodiment, the diagnostic/evaluation server may provide the customer with service guidance indicating what the cause of the problem is and the steps the customer should take to remedy the problem. For example, the diagnostic/evaluation server may provide the customer with a web address from which the customer may obtain the necessary software upgrade. In an embodiment, after the user has taken remedial action, the agent on the mobile device may take another snapshot of the mobile device and send this to the diagnostic/evaluation server or alternatively retain the snapshot on the mobile device in case the problem recurs.

In an embodiment, rather than or in addition to recommending a software upgrade, the diagnostic/evaluation server may recommend that the customer upgrade their mobile device to a newer model that may be less likely to suffer from the issues the customer is encountering with their current mobile device. Thus, again, in addition to the opportunity to help the customer solve their problem, the service provider may take the customer's inquiry as an opportunity to upsell to the customer.

Turning now to FIG. 1, a system 100 for obtaining a snapshot of mobile device characteristics and correlation of state and diagnostic information with customer and care information for expert system and upsell is provided. In an embodiment, the system 100 comprises mobile devices 140, 150, a base transceiver station 124, a diagnostic/evaluation server 110, a solutions and upsell data store 120, a diagnostic computer/kiosk 130, and a network 106.

In an embodiment, diagnostic/evaluation server 110 may include a diagnostic application for diagnosing performance issues with mobile devices 140, 150 and an evaluation application for determining an appropriate corrective action to remedy the identified performance issue and for determining recommended upsells. In an embodiment, diagnostic/evaluation server 110 may comprise a diagnostic server and an evaluation server which may be implemented on the same or different data processing systems. For ease of description, the diagnostic/evaluation server 110 is shown as a single entity in FIG. 1.

In an embodiment, mobile device 140, 150 may be any portable electronic device including a mobile phone, a personal digital assistant (PDA), a smart phone, and a tablet computer. A smart phone may be a mobile device that includes not only the traditional features of a mobile phone, but also additional functionality such as, for example, providing e-mail service, web access, and still picture and video capture capability via a camera. A smart phone may also run applications including games and productivity applications. Examples of mobile devices include an Android™ enabled phone, an iPhone®, and an iPad®.

Mobile device 140, 150 may include a diagnostic agent 142, 152, static information 143, 153, history 144, 154, log files 145, 155, settings 146, 156, and system levels 147, 157. In an embodiment, diagnostic agent 142, 152 may be downloaded to the mobile device 140, 150 from diagnostic/evaluation server 110 via network 106. Diagnostic agent 142, 152 aids the diagnostic/evaluation server 110 in obtaining a snapshot of characteristics of mobile device 140, 150. In an embodiment, diagnostic agent 142, 152 may include instructions that cause mobile device 140, 150 to collect and store specified metrics or parameters. Diagnostic agent 142, 152 may also promote transmitting the snapshot of characteristics from mobile device 140, 150 to diagnostic/evaluation server 110. In an embodiment, diagnostic agent 142, 152 may be selected and transmitted to mobile device 140, 150 based on a reported problem by the user of mobile device 140, 150. In such cases, the diagnostic agent 142, 152 may be selected in order to acquire a snapshot that includes only selected data from mobile device 140, 150 that is likely to contain information sufficient to identify the cause of the reported problem while insuring that the size of the snapshot is small. In an embodiment, diagnostic agent 142, 152 provides a general snapshot from the mobile device 140, 150 to diagnostic/evaluation server 110 that is sufficient to enable diagnosis and analysis of a wide variety of possible performance issues on the mobile device 140, 150. However, the snapshot is typically still relatively small in size enabling transmission of the snapshot to the diagnosis/evaluation server 110 and evaluation of the snapshot by the diagnosis/evaluation server 110 to be relatively fast. In an embodiment, the size of the snapshot may be less than about one megabyte (MB). Diagnostic agent 142, 152 may perform some functions behind the scenes and not visible to the user. For example, diagnostic agent 142, 152 may perform test calls or install short live applications or manufacturer provided diagnostics to acquire information that can be stored and later provided in a snapshot of the mobile device 140, 150 which can provide feedback on component performances such as displays, radios, cameras, etc.

In an embodiment, static information 143, 153 are values of components in the mobile device 140, 150 that do not change over time or that change infrequently due to an upgrade of a component. For example, static information 143, 153 may include serial numbers of the mobile device 140, 150 and/or hardware components of the mobile device 140, 150, model numbers, version numbers, and fixed addresses (e.g., a Media Access Control (MAC) address).

In an embodiment, history 144, 154 is information indicating the value of various parameters at various historical times for the mobile device 140, 150. History 144, 154 may include network and connectivity history, such as, for example, open connections, uptime, throughputs, signal strengths, network published values, exceptions (e.g., 404's or locally), network identifiers, electric current and other electrical measures at various locations through the system. History 144, 154 may include runtime measures such as CPU/memory (fixed, virtual, external)/thread/procedure utilization and idle times. In an embodiment, history 144, 154 may include network Identifiers (e.g., base station id) to which the mobile device 140, 150 is connected obtained at various times. History 144, 154 may include thread contribution to CPU usage and the source applications for the threads. History 144, 154 may also include logical memory layouts from various times. In an embodiment, history 144, 154 may include user actions and activities which may shed light into problem areas for a particular user. For example, history 144, 154 may include histories of success/failures or less than preferred performance against various specifications and performance thresholds. History 144, 154 may also include failed login attempts into the mobile device 140, 150, an application, a website, a Virtual Private Network (VPN), etc. In an embodiment history 144, 154 may provide a regressable series of events so that combinations of contributing factors can be analyzed.

Log files 145, 155 are files in which the mobile device 140, 150 records various events. In an embodiment, log files 145, 155 may include boot logs, crash logs, lockup logs, failure logs, kernel logs, application logs, component logs, system/network stacks logs, and other error logs. Log files 145, 155 may also comprise other logs including logs for unknown or other error cases allowing components to register unknown or other error cases. For example, if a haptic sensor (a haptic sensor may receive tactile feedback, such as through a touch screen, or provide forces, vibrations, or motions that can be felt by a user of the mobile device 140, 150) receives an uninterpretable sensor reading, that information could be stored in log files 145, 155. As another example, if the keypad regularly has multi-key presses, this information could be stored in log files 145, 155. Log files 145, 155 may include soft/hard power cycles, times and application logs for running applications at the time of failure.

Settings 146, 156 are the values of changeable parameters on the mobile device 140, 150. Settings 146, 156 may include both user defined settings and factory preset setting. In an embodiment, settings 146, 156 may include, for example, WiFi enable on/off, Bluetooth® enable on/off, display brightness, sound volume, sound on/off, ring tone, and ringer on/off. In an embodiment, settings 146, 156 may include application shared preferences and profiles. In an embodiment, the number settings may be in excess of 100.

System levels 147, 157 indicate the current performance levels of various mobile device 140, 150 components. For example, system levels 147, 157 may include a battery charge level, uptime, and whether a screen is blank. System levels 147, 157 may also include specifications for the mobile device 140, 150 or components of the mobile device and acceptable performance tolerances of the mobile device 140, 150 hardware/software functions.

Returning now to the diagnostic agent 142, 152, the diagnostic agent 142, 152 may acquire or create an initial snapshot of characteristics of the mobile device 140, 150 and cause this initial snapshot to be transmitted to diagnostic/evaluation server 110. The initial snapshot may be created using information obtained from one or more of static information 143, 153, history 144, 154, log files 145, 155, settings 146, 156, and system levels 147, 157. In an embodiment, the initial snapshot may include other information obtained from other sources as well. In an embodiment, mobile device 150 may be connected to an in-store diagnostic computer/kiosk 130 which may acquire the initial snapshot and transmit the initial snapshot to the diagnostic/evaluation server 110. This may occur, for example, if a customer has brought their device to a service provider store or service center. A customer service technician or the customer may enter a description of the customer's complaint into diagnostic computer/kiosk 130 and this description may be appended to or otherwise included with the initial snapshot before the initial snapshot is transmitted to diagnostic/evaluation server 110.

In an embodiment, mobile device 140 may wirelessly transmit the initial snapshot to diagnostic/evaluation server 110. Diagnostic agent 142 may provide an interface in which a user may enter a description of a problem the user is having with the mobile device 140 and this user description may be included in the initial snapshot.

Diagnostic/evaluation server 110 receives the initial snapshot of characteristics of the mobile device 140, 150. In an embodiment, the performance issue is contained within the initial snapshot or is received along with the snapshot and may have been identified by the user of the mobile device 140, 150. In an embodiment, the diagnostic/evaluation server 110 may analyze the initial snapshot to determine a performance issue or to confirm or expand upon the performance issue identified by the user of the mobile device 140, 150. In order to determine the performance issue, the diagnostic/evaluation sever 110 may consult solutions and upsell data store 120 which may contain information associating certain data that may be contained in a snapshot with previously identified performance issues.

Once the diagnostic/evaluation server 110 determines the performance issue, diagnostic server 110 may analyze the snapshot to determine an appropriate solution or corrective action to suggest as a possible remedy to alleviate the performance issue on the mobile device 140, 150. In determining an appropriate solution or corrective action, diagnostic/evaluation server 110 may consult solutions and upsell data store 120. Solutions and upsell data store 120 may include data from performance issues that have occurred on other mobile devices and the solutions or corrective actions tried on those other mobile devices. By analyzing corrective actions tried on other mobile devices and their success rates, diagnostic/evaluation server 110 may make a reasonably intelligent guess as to a corrective action that is likely to remedy the identified performance issue with the mobile device 140, 150. The corrective actions tried previously may be organized in data store 120 such that there is an indication of the corrective actions success rate so that the diagnostic/evaluation server may recommend corrective actions beginning with those most likely to succeed. If a first recommended corrective action fails, the diagnostic/evaluation server 110 may recommend the next most successful corrective action from solutions and upsell data store 120 and repeat as necessary until a successful corrective action is implemented on the mobile device 140, 150.

Once diagnostic/evaluation server 110 determines a recommended corrective action, this recommended corrective action may be presented to the user or to a customer service representative. The user or customer service representative may then implement the recommended corrective action on the mobile device 140, 150. For example, if the mobile device 140, 150 user is having difficulty hearing the other party during a telephone call, the diagnostic/evaluation server 110 may recommend that the user adjust the volume settings on the mobile device. Since the user may be unfamiliar with how to do this, the diagnostic/evaluation server 110 may include with the recommendation instructions on how to do so. Alternatively, the diagnostic/evaluation server 110 may change the subject setting itself.

After the recommended corrective action has been implemented on the mobile device 140, 150, an after-care snapshot of the mobile device 140, 150 is obtained and transmitted to diagnostic/evaluation server 110. In an embodiment, the after-care snapshot is obtained immediately (e.g., within a few seconds or a few minutes) after the recommended corrective action is implemented. In an embodiment, the after-care snapshot is obtained less than about a day after implementation of the recommended corrective action. The diagnostic/evaluation server 110 analyzes the after-care snapshot to determine the effectiveness of the corrective action. If the corrective action was successful, the diagnostic/evaluation server 110 may update solutions and upsell data store 120 to reflect this fact. In this manner, over the course of numerous analyses of numerous mobile devices, the diagnostic/evaluation server 110 may refine the solutions and upsell data store to build an expert system that provides the ability to provide better recommendations in the future. In an embodiment, a second after-care snapshot may be obtained from the mobile device 140, 150 and transmitted to the diagnostic/evaluation server 110. The second after-care snapshot may be obtained after the passage of a predefined longer period of time than that of the first after-care snapshot. In an embodiment, this second after-care snapshot may be obtained a day, a week, a month, or several months after acquisition of the first after-care snapshot. This second after-care snapshot provides the service provider with additional information to analyze the effectiveness of a solution. In other words, this allows the service provider to not only determine whether the recommended corrective action remedied the solution immediately, but whether it continued to be a satisfactory solution long term.

In addition to determining whether the corrective action was successful, the diagnostic/evaluation server 110 may analyze the before and after snapshots to systematically determine what was changed without having a technician manually enter the corrective action taken. For example, the diagnostic/evaluation server 110 may derive if a problematic application was removed, whether WiFi was enabled, whether more memory was installed, whether a higher capacity battery was installed, etc.

If the first recommended corrective action was unsuccessful, diagnostic/evaluation server 110 may recommend a second corrective action having the next highest likelihood of success based on the results of past experiences contained in solutions and upsell data store 120. The diagnostic/evaluation server 110 continues making recommendations and evaluating the results of the implementation of those solutions until a successful resolution is achieved or until the diagnostic/evaluation server 110 runs out of corrective action recommendations.

If the diagnostic/evaluation server 110 cannot provide a recommended corrective action, the customer service representative may try various corrective actions using the representative's judgment and expertise. If one of these actions is successful, the after-care snapshot provided to the diagnostic/evaluation server 110 may indicate this fact. The diagnostic/evaluation server 110 may update the solutions and upsell data store 120 to reflect the solution and thereby be able to provide a recommended corrective action if the performance issue arises in the future.

Returning to the example of the user who is unable to hear the other party in a telephone conversation well, in an embodiment, if the first proposed corrective action (e.g., adjusting the volume level on the mobile device's 140, 150 speaker) fails to remedy the performance issue, the diagnostic/evaluation server 110 may provide the mobile device 140, 150 with an updated device driver for the speaker. Upon installing the updated device driver, a new after-care snapshot may be obtained and transmitted to the diagnostic/evaluation server 110 which may use the after-care snapshot to determine whether the new corrective action (e.g., the new device driver) successfully remedied the performance issue. If the updated device driver successfully resolved the performance issue, this fact will be noted in the solutions and upsell data store 120 by diagnostic/evaluation server 110. If the updated device driver was unsuccessful, this information may also be indicated in solutions and upsell data store 120 by diagnostic/evaluation server 110. The diagnostic/evaluation server 110 may continue to recommend new corrective actions until success is realized or until no more recommendations may be determined.

Rather than recommend a corrective action, diagnostic/evaluation server 110 may use the initial snapshot of characteristics to determine a recommended upsell. In an embodiment, upsell is a sales technique whereby a seller induces the customer to purchase more expensive items, upgrades, or other add-ons in an attempt to make a more profitable sale. Upselling usually involves marketing more profitable services or products but can also be simply exposing the customer to other options that were perhaps not considered previously. Additionally, as used herein, the term upsell may include cross-selling in which a seller attempts to sell something different from what the customer initially requests. The recommended upsell may be the first recommendation provided by the diagnostic/evaluation server 110 or may be a recommendation provided after corrective actions have been recommended, tried, and failed. For example, continuing with the above example in which the user has a difficult time hearing the other party during a telephone conversation, the diagnostic/evaluation server may analyze the initial snapshot and determine that a new mobile device may suit the user and alleviate the problems the user is having with their current mobile device. The recommendation of upselling to a new mobile device may also include selling points indicating the advantages of upgrading and how the upgrade will benefit the user. For example, the new recommended mobile device may have a speaker having a volume range greater than that of the user's current mobile device. The selling points may be communicated directly to the user or may be communicated only to the customer service representative thereby providing the customer service representative with talking points to encourage the user to purchase the new mobile device.

Other example of a diagnosis of performance issues that diagnostic/evaluation sever 110 may make include that if the user rapidly presses the screen but the display buffers do not change, this may imply lockup. Examples of upsells that may be recommended by diagnostic/evaluation server 110 may include a recommendation to upsell a family locater if a user frequently calls their kids. In an embodiment, the diagnostic/evaluation server 110 may recommend an upsell to a car charger if the user regularly is moving while using his phone and/or uses the GPS frequently. As a further example, if the user regularly makes calls or sends texts while moving, the diagnostic/evaluation server 110 may recommend to sell a Bluetooth® headset and/or an application for dictation. Table 1 provides a non-exhaustive list of additional examples of data that may be collected by the snapshot and corresponding inferences of performance issues that may be made based on that data as well as corresponding upsell recommendations and/or solutions to remedy the performance issues. Those skilled in the art will recognize other data that may be acquired in the snapshot as well as inferences/problem identification that may be made from the data and additional solutions and upsell possibilities.

TABLE 1

| INFORMATION ACQUIRED: | INFERENCES/PROBLEM IDENTIFICATION | POSSIBLE UPSELLS OR SOLUTIONS |
| --- | --- | --- |
| Data: All logs of types but not limited to boot, crash, lockup, failure, kernel, application, component, system/network stacks | Identify problem apps, contributing combinatorial problems, may help identify viruses | Protection apps |
| Components can register unknown or other error cases: e.g. if the haptic sensors receive an uninterpretable sensor reading that information could be stored, if the keypad regularly has multi-key presses this information could be stored | Reveals hardware and user errors, some of which are interpretable in one form or fashion | Could deflect calls to care by providing some training; identifying this on multiple devices could result in identifying a hardware problem |
| All user, carrier, manufacturer (e.g. ROM) level settings | User has functionality turned off but complains that functionality isn't working | Reduction in calls to care; on device app would suggest to the user to turn on the setting for the functionality |
| Hardware level static information like serial numbers, model numbers, version numbers, fixed addresses (e.g. MAC) | Could identify redundant number problems, can identify recall cases, etc. | Upgrade phone upsell |
| All runtime measures: CPU/memory (fixed, virtual, external)/thread/procedure utilization, idle times | Bad app recognition | Upsell protection and device "cleaning" apps |

TABLE 1-continued

| INFORMATION ACQUIRED: | INFERENCES/PROBLEM IDENTIFICATION | POSSIBLE UPSELLS OR SOLUTIONS |
|---|---|---|
| Network and connectivity: open connections, uptime, throughputs (if passive then historical), signal strengths, network published values, exceptions (e.g. 404's or locally) | Identify network latencies; heavy load from specific apps; identify network weak points | Upgrade from 3G to LTE device; turn on WiFi suggestion, etc. |
| Memory dumps and usage for various fixed, cache, buffer, RAM, ROMs | | Memory cards |
| Current system levels like batteries, uptime, blank screen | Regular low power operation might imply user has battery and/or charging problems. Combining this information with current drains can help identify problem components or user behaviors | Additional batteries, chargers, larger batteries, perhaps alternative devices |
| Component level basic feedback/diagnostics or queries | Problem components (displays, etc.) | Better phone with better components |
| Dialer and other address logs (common calls) | | Offer promos to bring friends |
| Drop device sensor | | Cases, replacements, warranties, protection insurance (actuarially adjusted for the drops) |
| GPS movement velocity, uptime, uptime while charger on | May show behaviors of customer when using GPS that would imply suggestions or other products | High GPS usage implies need for more battery life. Could also, based on velocity, suggest a dedicated GPS device for a car or other context |
| Installed Apps | May help identify problem apps against a database | Upsell missing ones, protection apps |
| Information from the AAA | | Suggest automatic payment or other scenarios that reduce calls to customer care |
| Timestamps for connected devices | | Warranty or upgrade scheduling based on notion that first time device connected implies date of purchase. E.g. "Your Bluetooth Handset is Old" |
| Connected devices lists (irDA, Bluetooth, WiFi) | | WiFi info may reveal travel and frequency patterns, could sell a number of items, services based on this |
| Manufacturers may provide information about accessories that we would not normally acquire such as device manufacturers, capabilities, etc. | | Competitor products identified and upsell accordingly |

In an embodiment, the diagnostic/evaluation server 110 may aggregate the data received from multiple snapshots of multiple mobile devices and executed tests over time to determine patterns. These patterns may be useful in determining solutions to problems as well as updating mobile devices with solutions to prevent problems from occurring before the problems are encountered. The diagnostic/evaluation server 110 may run queries of various mobile devices at various times to acquire additional data that may be useful in diagnosing problems as well as identifying potential problems and determining a fix before the potential problems are manifested. In an embodiment, the diagnostic/evaluation server 110 may not only notice patterns and run queries, but also be commanded or informed to produce outcomes. This may be referred to in some contexts as learning or the diagnostic/evaluation server 110 learning.

The base transceiver station 124 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 124, in an embodiment a plurality of base transceiver stations 124 may be existent and in operation.

The network 106 promotes communication between the components of the system 100. The network 106 may be any communication network including a public data network (PDN), a public switched telephone network (PSTN), a private network, and/or a combination.

Figure 2:
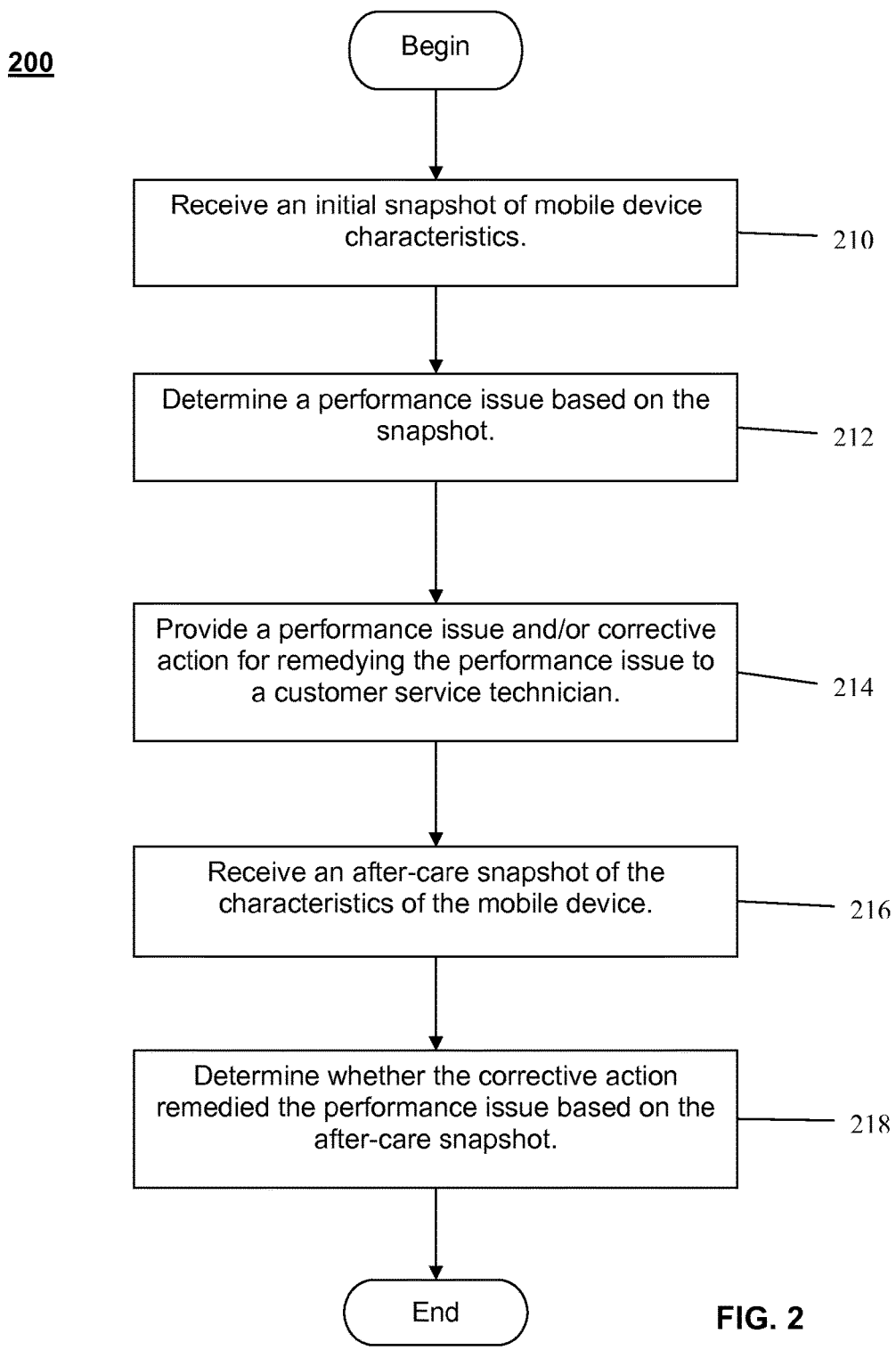
FIG. 2 is a flow chart illustrating a method according to an embodiment of the disclosure.

Turning now to FIG. 2, a method 200 for troubleshooting a mobile device is provided. Beginning at block 210, the server 110 receives an initial snapshot of mobile device characteristics from the mobile device 140, 150. At block 212, the server 110 determines the identity of a performance issue based on the initial snapshot. At block 214, the server 110 provides the performance issue and/or a recommended corrective action for remedying the performance issue to a customer service technician. At block 216, the server receives an after-care snapshot of the characteristics of the mobile device 140, 150. At block 218, the server 110 determines whether the corrective action remedied the performance issue based on the after-care snapshot.

Figure 3:
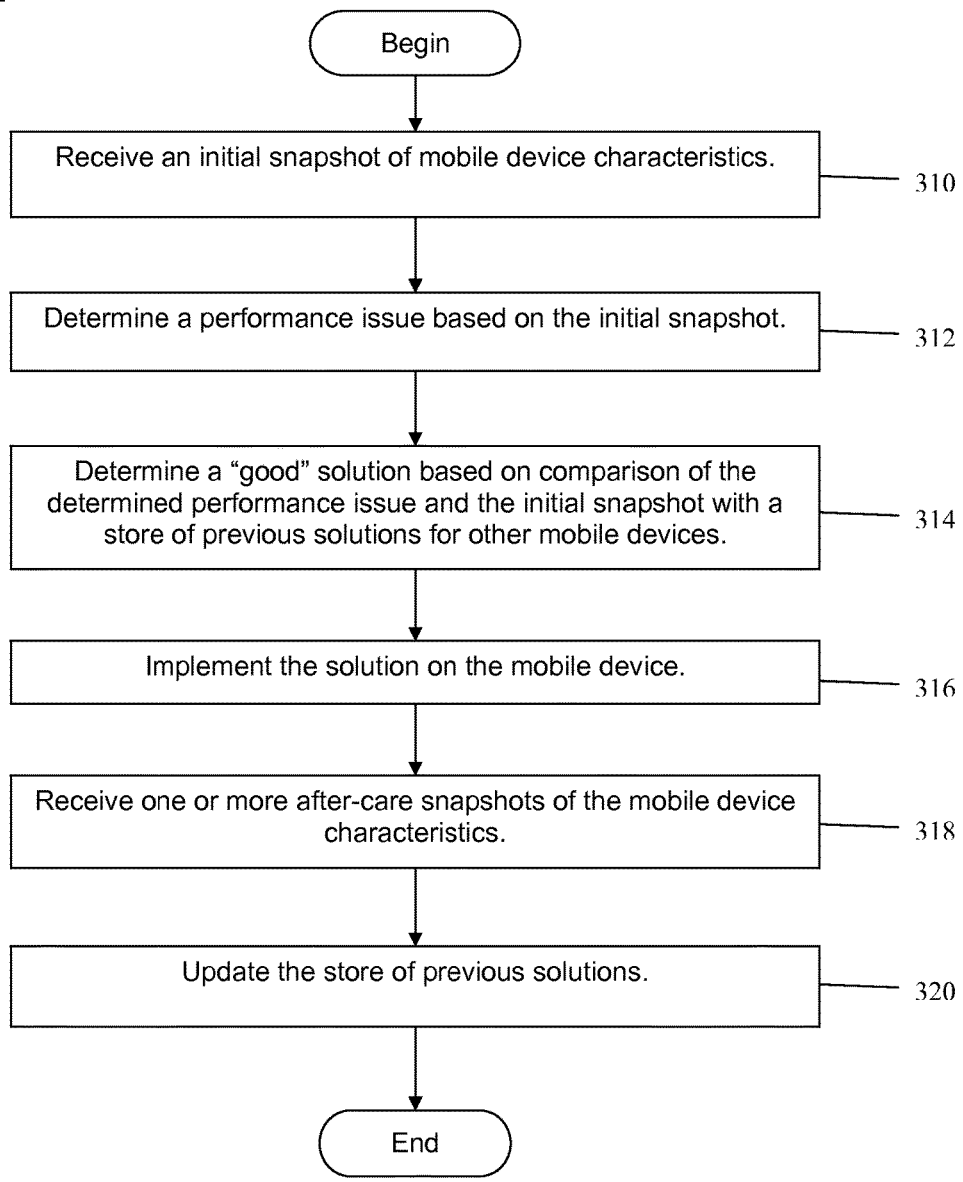
FIG. 3 is a flow chart illustrating a method according to an embodiment of the disclosure.

Turning now to FIG. 3, a method 300 for troubleshooting a mobile device is provided. Beginning at block 310, the server 110 receives an initial snapshot of mobile device characteristics. At block 312, the server 110 determines a performance issue for the mobile device 140, 150 based on the initial snapshot. The server 110 may consult a data store 120 of common performance issues and match the initial snapshot with data in the data store 120 to determine the performance issue. At block 314, the server 110 determines a solution (i.e., corrective action to take) based on comparison of the determined performance issue and the initial snapshot with the data store 120 of previous solutions for other similar mobile devices experiencing a similar performance issue. At block 316, the solution or corrective action is implemented on the mobile device 140, 150. The corrective action may be automatically initiated by the server 110 or the server 110 may provide a description of the corrective action to a customer service representative who may then implement the corrective action. At block 318, the server 110 receives one or more after-care snapshots of the mobile device 140, 150 characteristics taken after implementation of the corrective action. At block 320, the server 110 may update the data store 120 of solutions with data related to the most recent incident.

Figure 4:
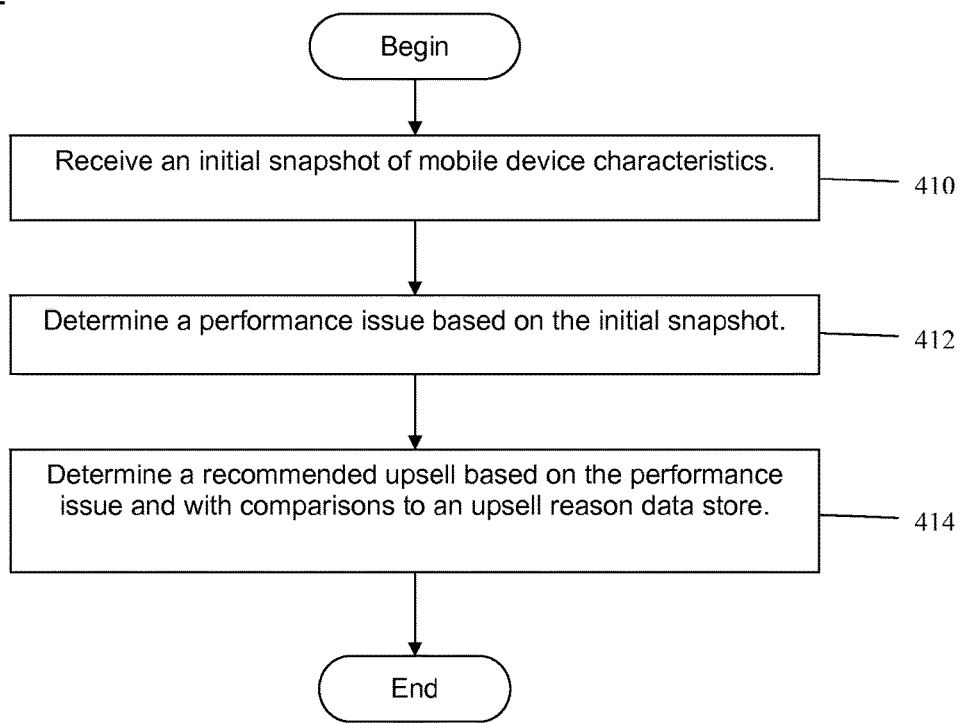
FIG. 4 is a flow chart illustrating a method according to an embodiment of the disclosure.

Turning now to FIG. 4, a method 400 for determining a recommended upsell is provided. Beginning at block 410, the server 110 receives an initial snapshot of mobile device characteristics from a mobile device 140, 150. At block 412, the server 110 determines a performance issue based on the initial snapshot. At block 414, the server 110 determines a recommended upsell based on the performance issue and on comparisons of the performance issue and initial snapshot with an upsell reason from data store 120.

Figure 5:
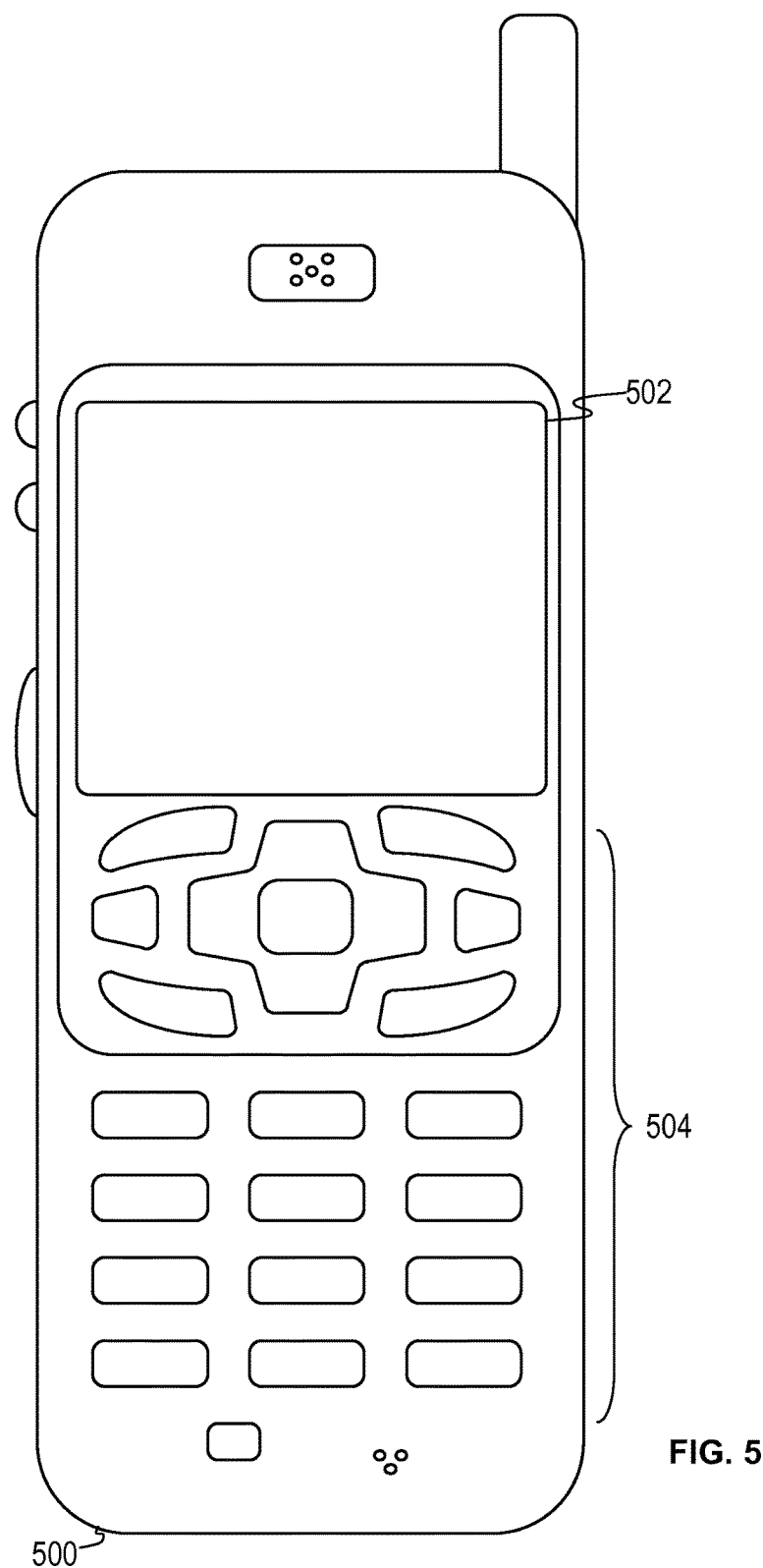
FIG. 5 is a pictorial diagram of a mobile device according to an embodiment of the disclosure.

FIG. 5 shows a wireless communications system including the mobile device 500. FIG. 5 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 502 and a touch-sensitive surface and/or keys 504 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 502 to show a web page. The web page may be obtained via wireless communications with a base transceiver station, a wireless network access node, a peer mobile device 500 or any other wireless communication network or system.

Figure 6:
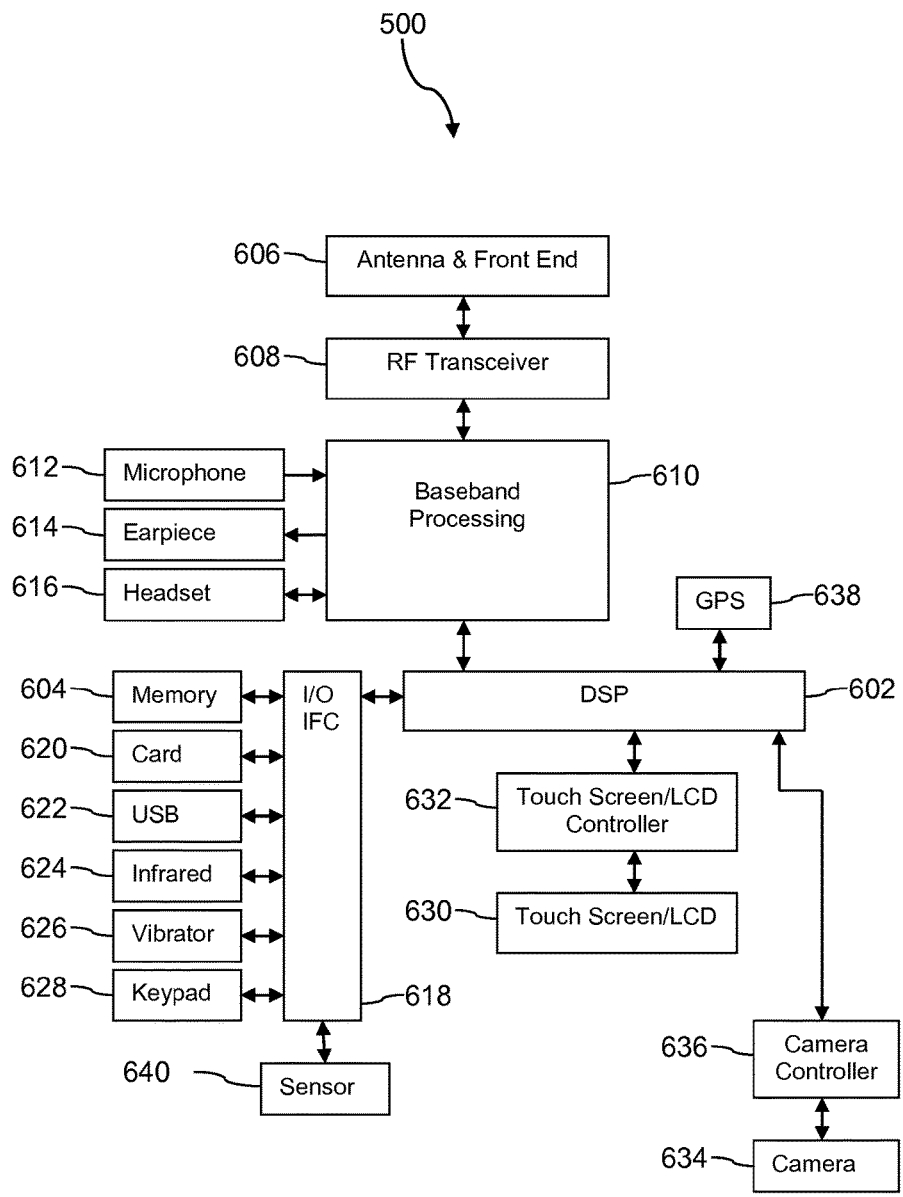
FIG. 6 is a block diagram of a mobile device according to an embodiment of the disclosure.

FIG. 6 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 602 and a memory 604. As shown, the mobile device 500 may further include an antenna and front end unit 606, a radio frequency (RF) transceiver 608, a baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a camera 634, a camera controller 636, a global positioning system (GPS) receiver 638, and a sensor 640. In an embodiment, the mobile device 500 may include another kind of display that does not provide a touch sensitive screen. In an embodiment, the DSP 602 may communicate directly with the memory 604 without passing through the input/output interface 618. Additionally, in an embodiment, the mobile device 500 may comprise other peripheral devices that provide other functionality.

The DSP 602 or some other form of controller or central processing unit operates to control the various components of the mobile device 500 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 500 to function as a peripheral device to exchange information with a personal computer or other computer system. The infrared port 624 and other optional ports such as a Bluetooth® interface or an IEEE 802.11 compliant wireless interface may enable the mobile device 500 to communicate wirelessly with other nearby handsets and/or wireless base stations.

The keypad 628 couples to the DSP 602 via the interface 618 to provide one mechanism for the user to make selections, enter information, and otherwise provide input to the mobile device 500. Another input mechanism may be the touch screen LCD 630, which may also display text and/or graphics to the user. The touch screen LCD controller 632 couples the DSP 602 to the touch screen LCD 630. The GPS receiver 638 is coupled to the DSP 602 to decode global positioning system signals, thereby enabling the mobile device 500 to determine its position.

Sensor 640 couples to the DSP 602 via the interface 618 to provide a mechanism to determine movement and/or relative orientation of the mobile device 500. The sensor 640 may provide information to DSP 602 indicating the orientation that the mobile device 500 is being held (e.g., face up, face down, face perpendicular to the ground). Sensor 640 may also provide information indicating whether the mobile device 500 is being moved (e.g., right to left, up to down) and indicate sudden accelerations and/or decelerations. Sudden decelerations may indicate that the mobile device 500 has been dropped. Sensor 640 may include an accelerometer to measure various motions and orientations of the mobile device 500. Measurements from sensor 640 may be provided to DSP 602 which may record the measurement and a time stamp in a log file stored, for example, in memory 604.

In an embodiment, sensor 640 may include other sensors, such as, for example, a temperature sensor and/or a current meter for measuring current flow from the mobile device's 500 battery. The temperature sensor may detect the temperature of the mobile device 500 or various components of the mobile device 500 to indicate whether a component (e.g., an RF circuit) may be over heating. Additionally, in an embodiment, the mobile device 500 may comprise other sensors that provide other functionality.

Figure 7A:
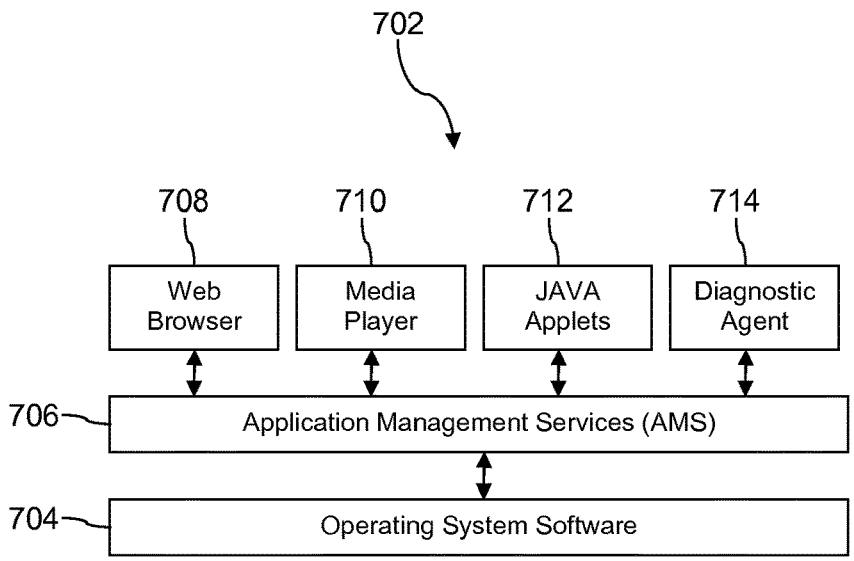
FIG. 7A illustrates a software environment for a mobile device according to an embodiment of the disclosure.

FIG. 7A illustrates a software environment 702 that may be implemented by the DSP 602. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the mobile device 500. Also shown in FIG. 7A are a web browser application 708, a media player application 710, JAVA applets 712, and a diagnostic agent 714. The web browser application 708 may be executed by the mobile device 500 to browse content and/or the Internet, for example when the mobile device 500 is coupled to a network via a wireless link. The web browser application 708 may permit a user to enter information into forms and select links to retrieve and view web pages. The media player application 710 may be executed by the mobile device 500 to play audio or audiovisual media. The JAVA applets 712 may be executed by the mobile device 500 to provide a variety of functionality including games, utilities, and other functionality. The diagnostic agent 714 may be executed by the mobile device 500 to acquire selected snapshot information from the mobile device and transmit the snapshot to a service provider. The diagnostic agent 714 may be substantially similar to the diagnostic agent 142, 152 described above with reference to FIG. 1.

Figure 7B:
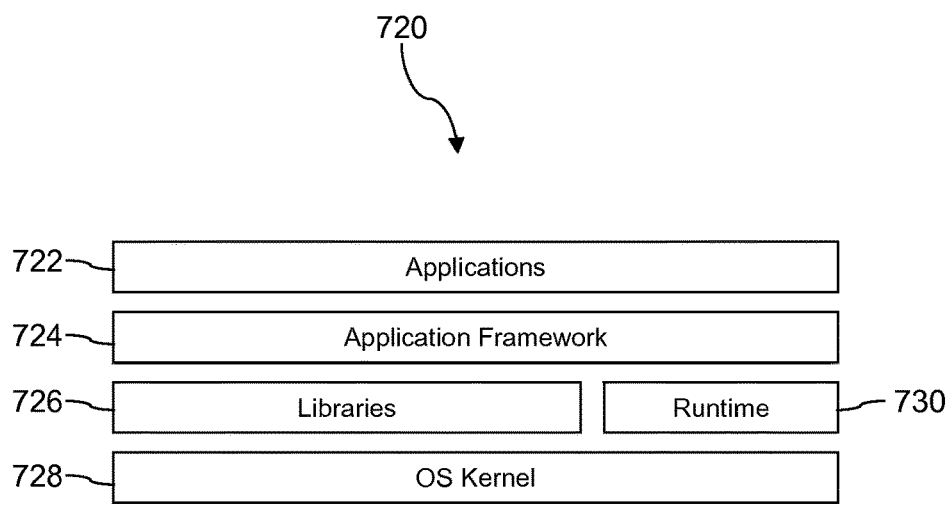
FIG. 7B illustrates an alternative software environment for a mobile device according to an embodiment of the disclosure.

FIG. 7B illustrates an alternative software environment 720 that may be implemented by the DSP 602. The DSP 602 executes operating system software 728 and an execution runtime 730. The DSP 602 executes applications 722 that may execute in the execution runtime 730 and may rely upon services provided by the application framework 724. Applications 722 and the application framework 724 may rely upon functionality provided via the libraries 726.

Figure 8:
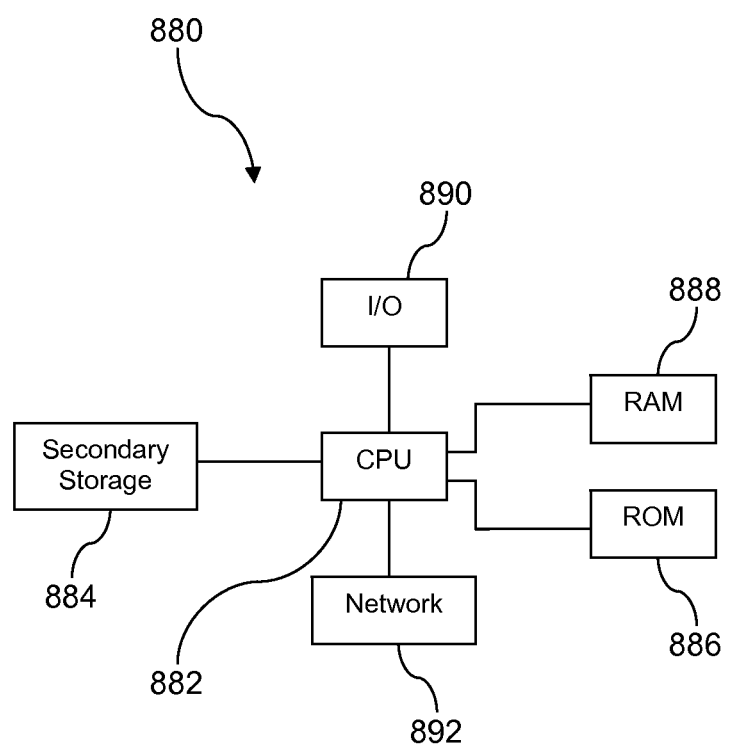
FIG. 8 illustrates an exemplary computer system suitable for implementing some aspects of the several embodiments of the disclosure.

FIG. 8 illustrates a computer system 880 suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as computer readable storage media and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 892 may enable the processor 882 to communicate with the Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data structures in part by directly accessing the computer program product, for example by reading from a CD-ROM disk inserted into a disk drive peripheral of the computer system 880. Alternatively, the processor 882 may process the executable instructions and/or data structures by remotely accessing the computer program product, for example by downloading the executable instructions and/or data structures from a remote server through the network connectivity devices 892. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

In some contexts, the secondary storage 884, the ROM 886, and the RAM 888 may be referred to as a non-transitory computer readable medium or a computer readable storage media. A dynamic RAM embodiment of the RAM 888, likewise, may be referred to as a non-transitory computer readable medium in that while the dynamic RAM receives electrical power and is operated in accordance with its design, for example during a period of time during which the computer 880 is turned on and operational, the dynamic RAM stores information that is written to it. Similarly, the processor 882 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of troubleshooting with a diagnostic agent on a mobile device, the method comprising:
receiving, by the mobile device, the diagnostic agent prior to contacting a customer service representative or a diagnostic server wirelessly for diagnosis and solution, and storing, by the mobile device, the diagnostic agent to a non-transitory memory of the mobile device, wherein the diagnostic agent includes instructions that cause the mobile device to monitor parameters of the mobile device and to record events related to the parameters into a log file stored in the non-transitory memory of the mobile device;
receiving, in a non-transitory memory at a diagnostic server from the diagnostic agent executed by a processor on the mobile device, an initial snapshot of characteristics from the mobile device via the diagnostic agent, wherein the initial snapshot of characteristics includes an identity of the mobile device, a state of the mobile device, and metrics related to the mobile device that enable determination of at least one corrective action for remedying performance issues;
determining, by the diagnostic server, a performance issue associated with at least the mobile device based on the initial snapshot;
automatically initiating, by the diagnostic server, a corrective action based on the determination of the performance issue, wherein the corrective action is performed on the mobile device in response to the initiating;
subsequent to the automatic initiation of the corrective action, receiving, in a non-transitory memory at the diagnostic server, an after-care snapshot of the characteristics from the mobile device in response to the corrective action being performed on the mobile device;
determining, by the diagnostic server, that the corrective action remedied the performance issue for the mobile device based on the after-care snapshot;
after a predefined period of time after acquisition of the after-care snapshot, receiving, in a non-transitory memory at the diagnostic server, a second after-care snapshot of the characteristics from the mobile device, wherein the after-care snapshot and the second after-care snapshot comprise mobile device performance information;
determining, by the diagnostic server, that the corrective action continued to remedy the performance issue for the mobile device based on the second after-care snapshot;
receiving, by the diagnostic server from a plurality of mobile devices, a plurality of snapshots that each correspond with one mobile device of the plurality of mobile devices associated with a service provider;
determining, by the diagnostic server, that a pattern exists from the plurality of snapshots, wherein the pattern is related to information provided by a diagnostic agent on at least one of the plurality of mobile devices;
identifying, by the diagnostic server, a potential issue in the plurality of mobile devices and determining a solution to the potential issue based on the pattern determined; and
updating, by the diagnostic server, the plurality of mobile devices with the solution, wherein each of the plurality of mobile devices is updated with the solution before the potential issue manifests on the plurality of mobile devices.

2. The method of claim 1, further comprising:
determining, by the diagnostic server, the corrective action based on the determination of the performance issue; and
providing, by the diagnostic server for the mobile device via a network, a message having a description of the performance issue determined and the corrective action initiated for remedying the performance issues.

3. The method of claim 1, wherein the initial snapshot of characteristics comprises at least one of: a log file, a memory dump, a serial number of the mobile device, a serial number of hardware included in the mobile device, a serial number of software installed on the mobile device, a serial number of firmware installed on the mobile device, on/off settings on the mobile device, or user settings of the mobile device.

4. The method of claim 1, wherein the initial snapshot of characteristics comprises: a log file, a memory dump, a serial number of the mobile device, a serial number of hardware included in the mobile device, a serial number of software installed on the mobile device, a serial number of firmware installed on the mobile device, on/off settings on the mobile device, and user settings of the mobile device.

5. The method of claim 1,
wherein the monitored parameters and the log file are included in at least one of the initial snapshot or the after-care snapshot.

6. The method of claim 1, wherein the performance issue comprises at least one of: handset malfunctions, a connectivity issue associated with communicative coupling to a network, dropped calls, hardware malfunctions, software issues, damage to the mobile device, or battery performance that is determined by the diagnostic server as being inferior based on data analyzed from a data store.

7. A method of troubleshooting with a diagnostic agent executing on a mobile device, comprising:
receiving, by the mobile device, the diagnostic agent prior to contacting a customer service representative or a diagnostic server wirelessly for diagnosis and solution, and storing, by the mobile device, the diagnostic agent to a non-transitory memory of the mobile device, wherein the diagnostic agent includes instructions that cause the mobile device to monitor parameters of the mobile device and to record events related to the parameters into a log file stored in the non-transitory memory of the mobile device;
receiving, in a non-transitory memory at a diagnostic server from the diagnostic agent executed by a processor on the mobile device, an initial snapshot of mobile device characteristics associated with the mobile device, wherein the initial snapshot comprises mobile device state information and static diagnostic information;
determining, by the diagnostic server executing a diagnostic application that configures a processor, that the mobile device has a performance issue based on an analysis of the mobile device state information and the static diagnostic information;

determining, by the diagnostic server, corrective action that is recommended for the mobile device based on the performance issue and past corrective actions taken on other mobile devices that experienced the performance issue, wherein the past corrective actions are stored in a non-transitory memory of a solutions data store communicatively coupled with the diagnostic server;

updating, by the diagnostic server, the corrective action based on a determination that a pattern exists from a plurality of snapshots from a plurality of mobile devices, wherein the pattern is related to information provided by a diagnostic agent on at least one of the plurality of mobile devices;

automatically initiating, by the diagnostic server, implementation of the updated corrective action on the mobile device based on determining the performance issue, past corrective actions taken on the other mobile devices, and the pattern determined, wherein each of the plurality of mobile devices implements the updated corrective action before the potential issue manifests on the plurality of mobile devices;

subsequent to the automatic initiation of the updated corrective action, receiving, at the diagnostic server via the diagnostic agent of the mobile device, an after-care snapshot of the mobile device characteristics in response to implementation of the updated corrective action on the mobile device;

determining, by the diagnostic server, a success rate for the updated corrective action implemented on the mobile device based on at least the after-care snapshot;

after a predefined period of time after acquisition of the after-care snapshot, receiving, at the diagnostic server via the diagnostic agent on the mobile device, a second after-care snapshot of the characteristics from the mobile device, wherein the after-care snapshot and the second after-care snapshot comprise mobile device performance information; and determining, by the diagnostic server, that the corrective action continued to remedy the performance issue for the mobile device based on the second after-care snapshot.

8. The method of claim 7, further comprising: determining, by the diagnostic server, a next corrective action in response to the success rate determined for the corrective action being below a threshold, wherein the threshold corresponds with failure to resolve the performance issue.

9. The method of claim 7, further comprising: updating, via the diagnostic server, a list of corrective actions in the non-transitory memory of the solutions data store that reflects results of implementing the updated corrective action on the mobile device.

10. The method of claim 7, wherein the solutions data store comprises an association of at least one performance issue with an identity of a type of mobile device and with at least one recommended solution of a plurality of recommended solutions, each recommended solution being a corrective action.

11. The method of claim 10, wherein each recommended solution indicates the frequency with which the implementation of that recommended solution resulted in a successful resolution of the performance issue, and wherein the determining the corrective action comprises selecting one of the plurality of recommended solutions having a highest success rate in resolving performance issues of other mobile devices.

12. The method of claim 7, wherein the after-care snapshot is received, in a non-transitory memory coupled to the diagnostic server, less than about a day after implementation of the updated corrective action on the mobile device.

13. The method of claim 1, wherein at least one of the plurality of mobile devices has not implemented a corrective action.

14. The method of claim 13, further comprising:
updating, by the diagnostic server, a list of corrective actions in the non-transitory memory of a data store in response to identifying the potential issue.

15. The method of claim 14, further comprising: initiating, by the diagnostic server, a second corrective action to at least one of the plurality of mobile devices based the potential issue and prior to the at least one mobile device manifesting the potential issue.

* * * * *